United States Patent [19]
Ohmori

[11] Patent Number: 5,228,638
[45] Date of Patent: Jul. 20, 1993

[54] TAPE LOADING APPARATUS OF 8 MM VIDEO TAPE REWINDER

[75] Inventor: Shigeyuki Ohmori, Gotemba, Japan

[73] Assignee: Showa Electric Co., Ltd., Taipei, Taiwan

[21] Appl. No.: 831,854

[22] Filed: Feb. 5, 1992

[51] Int. Cl.⁵ .......................... G11B 15/32; G03B 1/04
[52] U.S. Cl. ...................................... 242/200; 242/199
[58] Field of Search .............. 242/198, 199, 200, 201, 242/202, 203, 204; 360/95

[56] References Cited

U.S. PATENT DOCUMENTS

| | | | |
|---|---|---|---|
| 3,673,348 | 6/1972 | Larkin | 360/85 |
| 4,663,681 | 5/1987 | Kodama | 242/200 X |
| 4,750,062 | 6/1988 | Suzuki | 360/95 X |
| 4,797,760 | 1/1989 | Rademacher et al. | 360/95 |

FOREIGN PATENT DOCUMENTS 1042909  6/1953  France ................................ 360/95

Primary Examiner—Daniel P. Stodola
Assistant Examiner—John Rollins
Attorney, Agent, or Firm—Fish & Richardson

[57] ABSTRACT

A tape loading apparatus of an 8 mm video tape rewinder is provided with a pair of loading arms (19) and (20) pivotally connected to form a V-shaped structure by means of a sliding post (24). A pair of tape loading posts (17) and (18) are disposed at the divided end of the V-shaped tape loading arms, which can be expanded by means of motion of the sliding post (24) taking place in a vertical sliding groove (25) so as to permit a video tape (1) contained in a video tape cassette (3) to be drawn out by the tape loading posts and to be placed in a rewinding position.

5 Claims, 4 Drawing Sheets

TAPE LOADING APPARATUS OF 8 MM VIDEO TAPE REWINDER

BACKGROUND OF THE INVENTION

The present invention relates to an 8 mm video tape rewinder for use in rewinding or forwarding an 8 mm video tape received in a cassette case, and more particularly to an apparatus for loading the 8 mm video tape.

An 8 mm video tape is a magnetic tape having a width of eight millimeters and is designed to be held in a cassette case. It is generally used for recording images and sounds and for modulating the pulse codes. It is now often used in recording images and sounds in view of the fact that the 8 mm video camera is miniaturized and light in weight.

The videotaping process involves an operation of transporting an 8 mm magnetic tape past a video frequency magnetic head to read or record electronic impulses. The completed videotape is then rewound for later playing. Such operation of rewinding the completed videotape can be carried out either in the video camera or the video deck. Neither operations of recording nor reproducing images can be performed by the video camera or video deck while rewinding the completed videotape. As a result, a videotape rewinder was developed and introduced exclusively for rewinding the completed videotape so as to relieve both video camera and video deck of the rewinding work.

The 8 mm video cassette is not provided therein with a videotape winding guide post. Therefore, a loading apparatus for recording, reproducing and rewinding the videotape is provided outside the video cassettes of video camera, video deck and rewinder.

As shown in FIG. 1, an 8 mm videotape 1 is contained in a video cassette 3 in such a manner that it makes contact with a tape supporting post 2. Under such circumstance, the operations of recording, reproducing, rewinding and fast-forwarding can not be executed.

The FIG. 2 shows a video cassette 3 containing an 8 mm video tape set in a video camera or a video deck in such a manner that it permits the video tape to be recorded, reproduced, rewound or fast-forwarded. The magnetic tape 1 is shown to have been drawn out of the 8 mm video tape cassette 3 by a tape loading post 4 and to have been guided by a plurality of tape guiding posts 5-16 to pass a video head cylinder 6. Under such circumstance, the video tape 1 does not make contact with the tape supporting post 2. As a result, the operations of recording, reproducing, rewinding and fast-forwarding can be executed.

In order to perform a rewinding operation, a video tape rewinder is provided with a tape loading apparatus having tape loading posts 17 and 18, as shown in FIG. 3. The tape loading posts 17 and 18 can be driven respectively to move from the positions 17a and 18a to the positions 17b and 18b. As shown in FIG. 4, a tape loading apparatus of the prior art is shown comprising a driving arm 22, a pair of connecting arms 21, a pair of gears 29, and a pair of loading arms 19 and 20. The driving arm 22 is located at the center of the long side of the video tape cassette and is capable of moving in parallel to the short side of the video tape cassette. The connecting arms 21 are pivotally connected at the centers thereof to a pivot 27 located on the base of the rewinder, with one end thereof coupled with the upper end of the driving arm 22, and with other end thereof provided with a sector gear 28. The gears 29 are rotatably mounted on the base of the rewinder in such a manner that they mesh with the sector gear 28. Each of the loading arms 19 and 20 is provided at one end thereof with tape loading posts 17 and 18 and is secured at the other end to a central axle of the gear 29. When the driving arm 22 is driven downward, the driving force is imparted via connecting arms 21 and gears 29 to the tape loading posts 17 and 18, which subsequently move from positions 17a and 18a to positions 17b and 18b where the rewinding operation can be executed.

As shown in FIG. 4, the loading arms 19 and 20 and the gears 29 of the tape loading apparatus are spaced apart at large intervals and are located beyond both sides of the tape loading posts 17 and 18. As a result, the shape and the size of the tape loading apparatus can not be reduced to compact forms.

SUMMARY OF THE INVENTION

It is therefore the primary objective of the present invention to provide a tape loading apparatus with means permitting a video tape rewinder to be made in a small and compact form.

In keeping with the principles of the present invention, the primary objective of the present invention is accomplished by a tape loading apparatus of an 8 mm video tape rewinder, which is provided with a pair of loading arms (19) and (20) arranged in a V-shape, with sliding post (24) pivotally connecting the loading arms at the vertex of the V. A pair of tape loading posts (17) and (18) are disposed at the ends of the tape loading arms at the open end of the V, which can be expanded by means of motion of the sliding post (24) taking place in a vertical sliding groove (25) so as to permit the video tape (1) contained in the video tape cassette (3) to be drawn out by the tape loading posts and to be placed in a rewinding position. The dimension of the tape rewinder can thereby be miniaturized.

The foregoing objective and features of the present invention can be better understood by studying the following detailed description of the preferred embodiment of the present invention in conjunction with drawings provided herewith.

DETAILED DESCRIPTION OF THE PREFERRED EMBODIMENT

Figure 1:
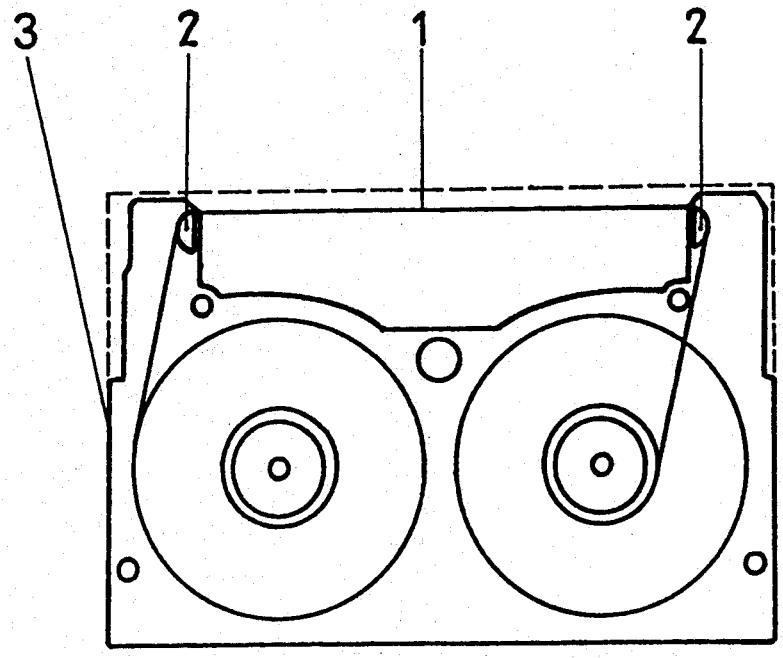
FIG. 1 shows a plan view of interior of an 8 mm video tape cassette.
Figure 2:
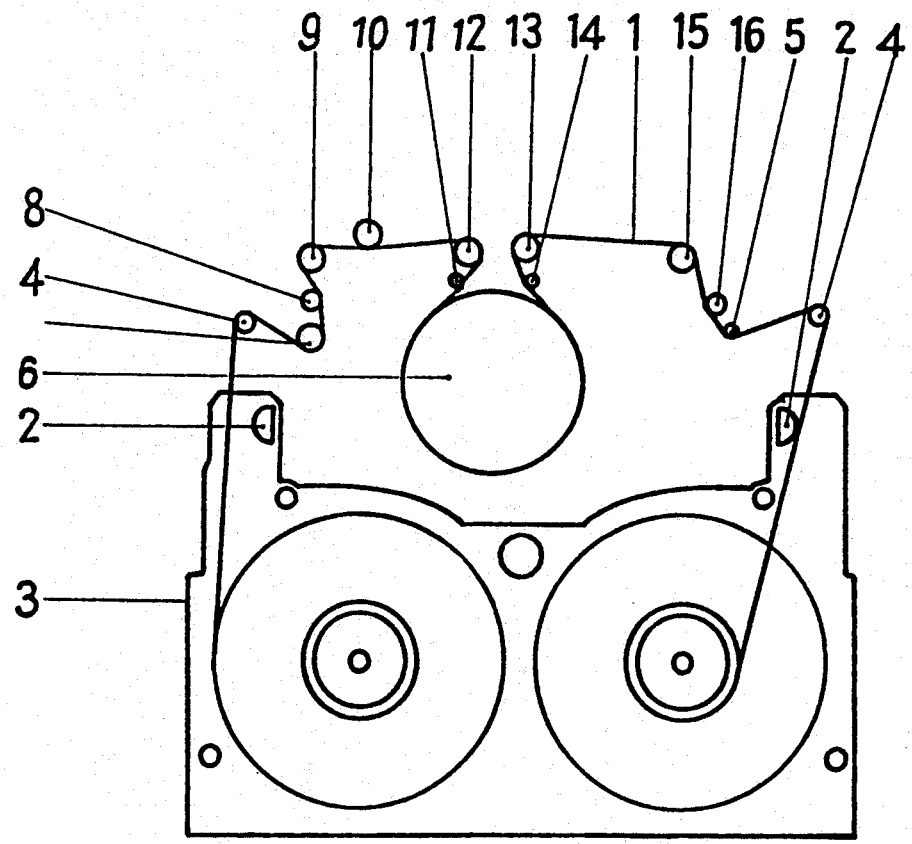
FIG. 2 shows a plan view of an 8 mm video tape cassette, as shown in FIG. 1, being loaded in a video camera or a video deck and being loaded with a tape.
Figure 3:
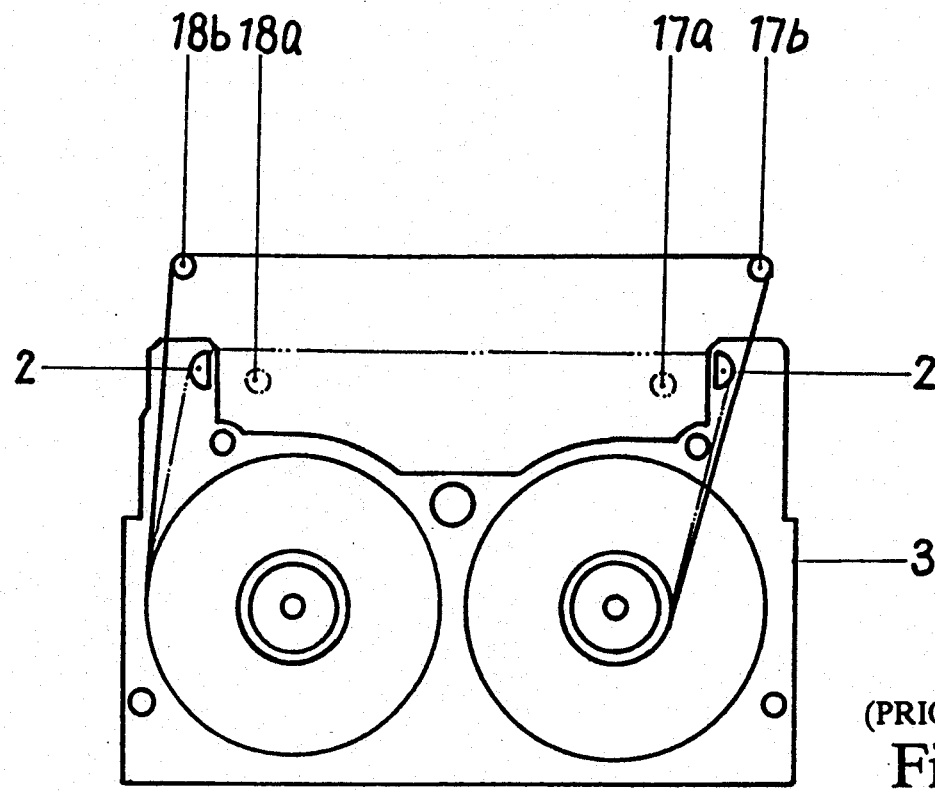
FIG. 3 shows a plan view illustrating the process by which a video tape contained in a video cassette is drawn out by tape loading posts of the tape rewinder.
Figure 4:
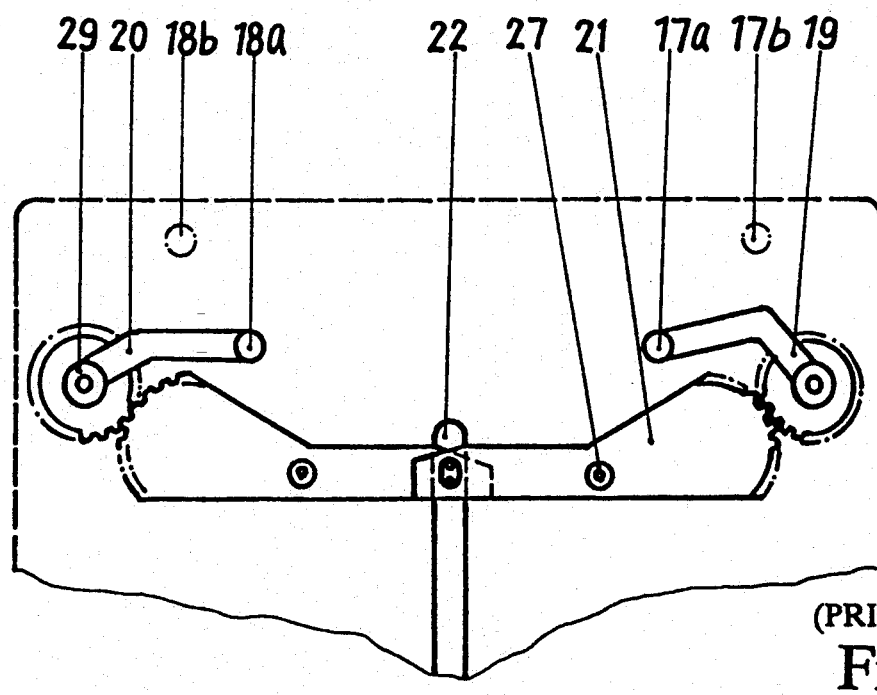
FIG. 4 shows a plan view of tape loading apparatus of video tape rewinder of prior art.
Figures 5, 7:
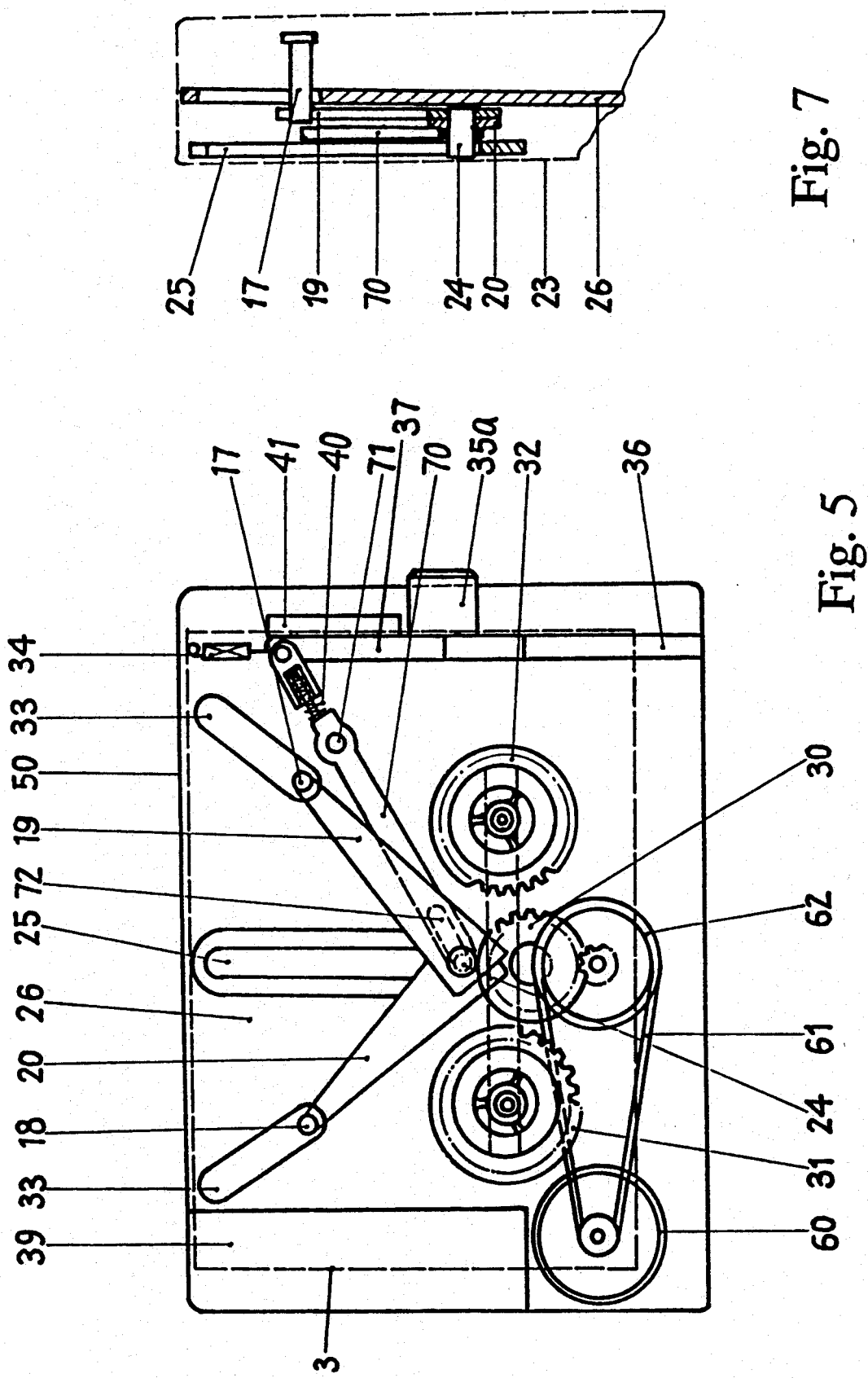
FIG. 5 shows a plan view of tape rewinder provided with tape loading apparatus of the present invention.
FIG. 7 shows a cross sectional view of portion of the tape rewinder as shown in FIG. 5.
Figure 6:
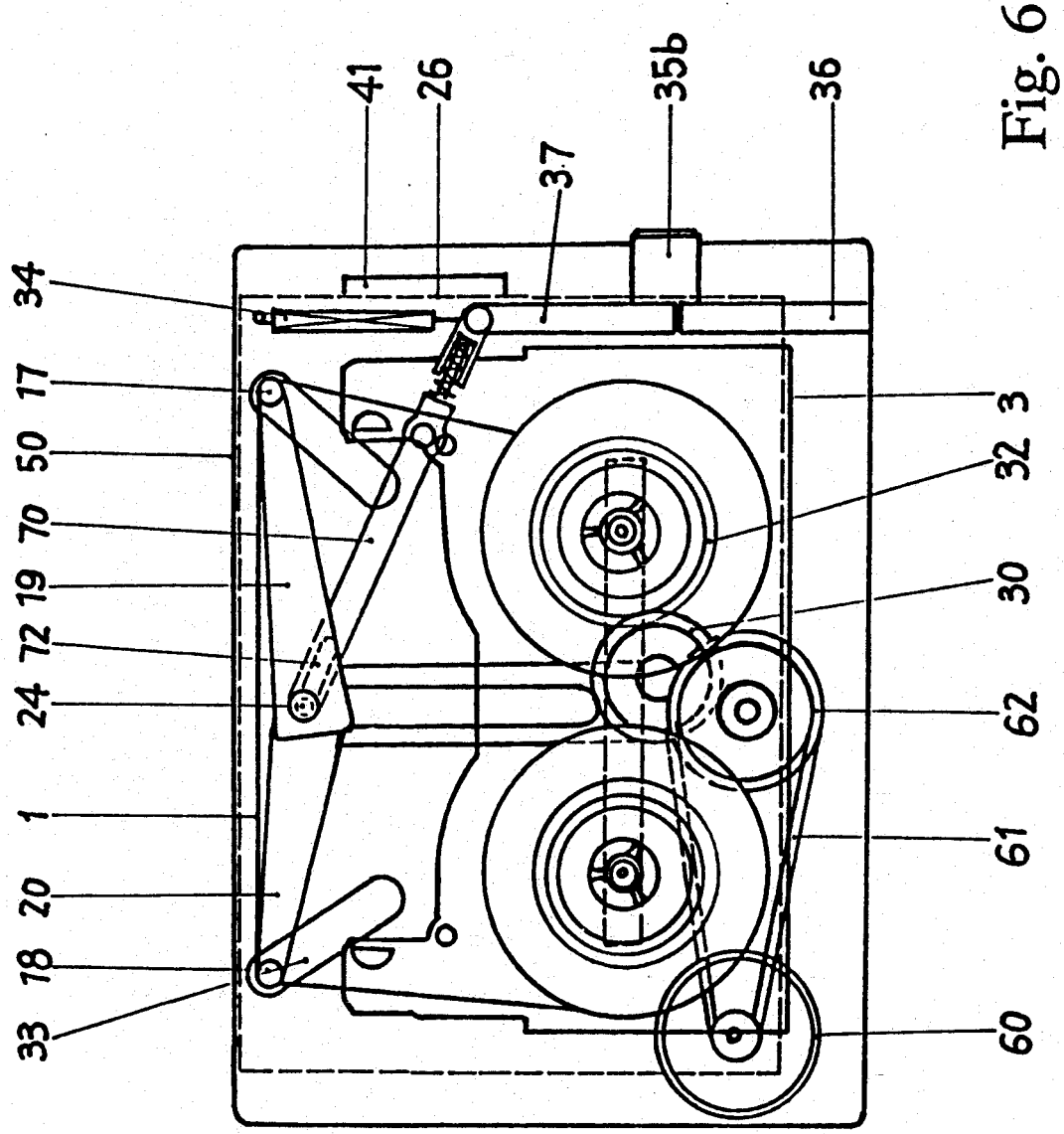
FIG. 6 shows a plan view of the tape rewinder, as shown in FIG. 5, forwarding an 8 mm video tape.

Referring to FIG. 5, 6 and 7, a tape rewinder is shown comprising a rewinder case 50 having a substrate plate 23 and a receiving plate 26 intended to accommodate an 8 mm video tape cassette 3. There are tape loading apparatus and rewinding apparatus disposed between the substrate plate 23 and the receiving plate 26. The rewinding apparatus is composed of a motor 60, a transmission belt 61, a transmission gear 62, a rewinding/forwarding switching gear 30, a rewinding gear 31, and a forwarding gear 32. The tape loading apparatus comprises a pair of narrow openings 33 disposed respectively on both sides of the receiving plate 26. The tape loading apparatus further comprises a pair of tape loading posts 17 and 18 extending beyond the narrow openings 33. The tape loading posts 17 and 18 can be driven to move from the bottom ends of the narrow openings 33 to the top ends of the narrow openings 33 so as to draw the video tape 1 out of the video cassette 3 to place the video tape 1 in a rewinding position, as shown in FIGS. 5 and 6. Subsequently, the rewinding/forwarding switching gear 30 is actuated to mesh with the rewinding gear 31 or the forwarding gear 32. In the meantime, the motor 60 is started by means of power provided by a battery 39. The driving force generated by the motor 60 is imparted via a transmission belt 61 and transmission gear 62 to the rewinding gear 31 or the forwarding gear 32, which in turn works to rewind or to forward the video tape 1. As shown in FIG. 6, the forwarding gear 32 advances a video tape 1.

The tape loading apparatus embodied in the present invention and described above further has a sliding groove 25 disposed in the substrate plate 23 in such a way that it is perpendicular to the video tape 1. Arranged between the tape loading posts 17 and 18 is, a pair of tape loading arms 19 and 20, a driving lever 70 which is supported by a shaft 71 near its center to the right. The lever 70 has a longitudinal 31 of 72 at one end and with a compression spring 40 in the other end. The shaft 71 is disposed on the substrate plate 23 (or the receiving plate 26) equidistantly from both ends of the sliding groove 25. A sliding post 24 pivotally connects the ends of the tape loading arms 19 and 20, and pass through the slot 72 of the driving lever 70 so as to be received slidably in the sliding groove 25.

The tape loading apparatus is operated as follows. Sliding a starting knob from position 35a (FIG. 5) to position 35b (FIG. 6) draws linkage member 37 downward, in turn pivoting driving lever 70 clockwise about shaft 71. Slot 72 of the driving lever 70 moves sliding post 24 upward in the sliding groove 25. Sliding post 24 in turn drives tape loading arms 19 and 20 upward until the tape loading posts 17 and 18 have reached the top ends of narrow openings 33. As a result, the tape loading posts 17 and 18 are able to draw the video tape 1 out of the video tape cassette 3, as shown in FIG. 6. At this time, the starting knob 35 is retained by a check knob 36. A stop-and-go spring 34 is fastened at one end thereof to the rewinder case and at another end thereof to the end of the driving lever 70 containing a compression spring 40. As soon as the starting knob 35 is released by the check knob 36, the stop-and-go spring 34 is capable of making the driving lever 70 to return from the position as shown in FIG. 6 to the position as shown in FIG. 5.

It has now become apparent that the present invention makes use of a sliding post 24 to permit the tape loading arms 19 and 20 to be connected pivotally and arranged in a V shape. In addition, a pair of tape loading posts 17 and 18 are disposed at the end of the tape loading arms at the open end of the V, which can be expanded by means of motion of the sliding post 24 taking place in a sliding groove 25 so as to permit the video tape 1 contained in the video tape cassette 3 to be drawn out by the tape loading posts and to be placed in a rewinding position. The dimension of the tape rewinder containing such tape loading apparatus embodied in the present invention can thereby be miniaturized.

What is claimed is:

1. A tape loading apparatus for use in an 8 mm video tape rewinder, said rewinder comprising a rewinder case and a receiving plate, said rewinder case having a substrate plate, said receiving plate disposed in said rewinder case to receive an 8 mm video tape cassette and a video tape therein, wherein:
   said receiving plate defines a pair of elongate slots;
   either said substrate plate or said receiving plate define a sliding groove such that said sliding groove is perpendicular to the long dimension of said video tape cassette;
   the tape loading apparatus arranged between said substrate plate and said receiving plate, and comprising:
   (a) a pair of tape loading arms;
   (b) a pair of tape loading posts, one mounted at an end of each of said tape loading arms and disposed within each of said elongate slots and arranged to move from one end of said elongate slot to another end of said elongate slot so as to draw said video tape from said video tape cassette and to place said video tape in a rewinding position;
   (c) a driving lever having a longitudinal slot near one end, said driving lever being pivotally supported at a point between the center of said driving lever and the end opposite said longitudinal slot by a pivot, said pivot disposed on said substrate plate or said receiving plate and being substantially equidistant from both ends of said sliding groove; and
   (d) a sliding post slidably mounted within said longitudinal slot in said driving lever and pivotally connecting said tape loading arms to said driving lever at the respective ends of said tape loading arms which are opposite said tape loading posts, said sliding post being slidably mounted within said sliding groove;
   (e) driving means for rotating said driving lever about said pivot, causing said sliding post to slide within said sliding groove and each of said tape loading arms to slide within a respective one of said elongate slots to draw said tape from said video tape cassette.

2. A tape loading apparatus of an 8 mm video tape rewinder according to claim 1 wherein said sliding groove is disposed in said substrate plate.

3. A tape loading apparatus of an 8 mm video tape rewinder according to claim 2 wherein said pivot is mounted on said substrate plate.

4. A tape loading apparatus of an 8 mm video tape rewinder according to claim 2 wherein said pivot is mounted on said receiving plate.

5. A tape loading apparatus of an 8 mm video tape rewinder according to claim 1 wherein said pivot is disposed on said substrate plate.

* * * * *

UNITED STATES PATENT AND TRADEMARK OFFICE
CERTIFICATE OF CORRECTION

PATENT NO. : 5,228,638
DATED : July 20, 1993
INVENTOR(S) : Shigeyuki Ohmori

It is certified that error appears in the above-indentified patent and that said Letters Patent is hereby corrected as shown below:

Column 3, line 33, delete "31 of" and insert --slot--.

Signed and Sealed this

Thirty-first Day of May, 1994

Attest:

BRUCE LEHMAN

Attesting Officer   Commissioner of Patents and Trademarks